(12) United States Patent
Murdoch et al.

(10) Patent No.: US 11,238,170 B2
(45) Date of Patent: Feb. 1, 2022

(54) DELEGATION USING PAIRWISE DECENTRALIZED IDENTIFIER

(71) Applicant: Microsoft Technology Licensing, LLC, Redmond, WA (US)

(72) Inventors: Brandon Murdoch, Reading (GB); Ankur Patel, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 131 days.

(21) Appl. No.: 16/803,498

(22) Filed: Feb. 27, 2020

(65) Prior Publication Data

US 2021/0271765 A1    Sep. 2, 2021

(51) Int. Cl.
| | |
|---|---|
| *G06F 21/00* | (2013.01) |
| *G06F 21/60* | (2013.01) |
| *G06F 16/23* | (2019.01) |
| *G06F 21/62* | (2013.01) |
| *H04L 9/30* | (2006.01) |
| *H04L 9/32* | (2006.01) |
| *H04L 29/06* | (2006.01) |

(52) U.S. Cl.
CPC ........ *G06F 21/604* (2013.01); *G06F 16/2365* (2019.01); *G06F 21/62* (2013.01); *H04L 9/30* (2013.01); *H04L 9/3236* (2013.01); *H04L 63/10* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2019/0228406 A1 | 7/2019 | Patel et al. | |
| 2020/0145229 A1* | 5/2020 | Li | H04L 9/3239 |
| 2020/0153606 A1* | 5/2020 | Li | H04L 9/30 |
| 2020/0220726 A1* | 7/2020 | Lougheed, III | G06F 16/211 |

OTHER PUBLICATIONS

"Sovrin Glossary V3", Retrieved From: https://sovrin.org/wp-content/uploads/Sovrin-Glossary-V3.pdf, Dec. 4, 2019, pp. 1-67.
"International Search Report and Written Opinion Issued in PCT Application No. PCT/US21/014064", dated Apr. 23, 2021, 12 Pages (MS#407881-WO-PCT).

* cited by examiner

*Primary Examiner* — Andrew J Steinle
(74) *Attorney, Agent, or Firm* — Workman Nydegger

(57) ABSTRACT

Delegating a scope of permission between pairwise DIDs. First, a computing system determines a relationship between the first DID and a second DID. The first DID and the second DID are pairwise DIDs. Based on the relationship, the computing system delegates a scope of permission owned by the first DID to the second DID. In particular, the computing system defines the scope of permission, grants a public key of the second DID the scope of the permission. The delegation of the defined scope of permission is signed by a private key of the first DID, such that the signature is a proof of the delegation. A portion of data related to the delegation is then propagated onto the distributed ledger.

20 Claims, 11 Drawing Sheets

600C

Select A Pairwise DID 610C
- ☐ DID A — DID E
- ☐ DID B — DID H
- ☐ DID C — DID D
- ☐ ...

Define/Update Relationship 620C
- ☐ Child-Parent
- ☐ Employee-Employer
- ☐ Customer-Service
- ☐ ...

Scope of Delegation 630C
- ☐ Scope X
- ☐ Scope Y
- ☐ Scope Z
- ☐ Manual Input
- ...

[Confirm 640C]

| Pairwise DIDs 610A | Relationship 630A |
|---|---|
| DID A 511 DID E 521 | Child-Parent 631 |
| DID B 512 DID H 531 | Employee-Employer 632 |
| ... 611A ... 612A | ... 633A |

| Relationship | Delegation |
|---|---|
| Child-Parent 621B | Scope X 631B |
| Employee-Employer 622B | Scope Y 632B |
| Customer-Service 623B | Scope Z 633B |
| ... 624B | ... 634B |

*FIG. 6B*

```
Delegation Proof 700

{"@context": ["CONTEXT"],
 ...
 "type": "Delegation",
 "delegator": "did:methodA:---ALICE'S DID---",
 "granted key": "did:methodA:---BOB'S DID---#key-1",
 "restriction": [
   {
     "type": "RestrictToMethod",
     "method": "Read"}],
 "signature": {
   "type": "RsaSignature",
   "created": "---TIME---",
   "creator": "did:methodA:---ALICE'S DID---#key-1",
   "signatureValue": "---SIGNATURE BY A PRIVATE KEY ASSOCIATED WITH ALICE'S DID"}
```

710 — "type"
720 — "delegator"
730 — "granted key"
740 — "restriction"
750 — "signature"
751 — "type"
752 — "created"
753 — "creator"
754 — "signatureValue"

FIG. 7

DELEGATION USING PAIRWISE DECENTRALIZED IDENTIFIER

BACKGROUND

Most of the currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles, and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent of any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of the distributed ledger cannot be altered retroactively without the alteration of all subsequent sections of the distributed ledger, which provides a fairly secure platform. In such a decentralized environment, each owner of DID generally has control over his/her own data using his/her DID. The DID owner access the data stored in the personal storage that is associated with the DID via a DID management module, which is a mobile app, a personal computer, a browser, etc.

The subject matter claimed herein is not limited to embodiments that solve any disadvantages or that operate only in environments such as those described above. Rather, this background is only provided to illustrate one exemplary technology area where some embodiments described herein is practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to delegating a scope of permission between pairwise decentralized identifiers (DIDs). In the decentralized environment, a DID owner can generate and use many different DIDs to communicate with other DID owners. Pairwise DIDs are referred to as a pair of DIDs that are only used for communications between two entities. For example, a first DID owner owns a first DID, and a second DID owner owns a second DID. When the first DID and the second DID are pairwise DIDs, the first DID and the second DID are used only between the first DID owner and the second DID owner. When the first owner is to communicate with a third DID owner, a third DID will be generated and used. Similarly, when the second DID owner is to communicate with the third DID owner, a fourth DID will be generated.

Since the pairwise DIDs are only used between two owners, the relationship between the two owners can often be clearly identified, such as parent-child relationship, employer-employee relationship, customer-service relationship, etc. When a certain relationship exists, one DID owner may want to grant a scope of permission to the other DID owner. For example, a child would likely want to delegate his/her parents a scope of permission to allow the parents to act on behalf of the child.

In a centralized environment, such types of delegation are often performed manually via executing and presenting written agreements to other parties, which is burdensome and prone to fraud. The principles described herein allows various delegations to be securely and automatically executed and validated in a decentralized environment using computing systems and cryptographic technologies.

When a first DID owner delegates a scope of permission to a second DID owner, the first DID owner is a delegator, and the second DID owner is a delegatee. The delegation of a scope of permission from a delegator to a delegatee is likely performed by a computing system that is associated with the delegator (e.g., a management module (e.g., a wallet app), a user agent, and/or an ID hub of the delegator). The computing system first determines a relationship between the owners of the pairwise DIDs. Based on the relationship, the computing system then delegates a scope of permission owned by the delegator DID to the delegatee DID. In particular, the computing system defines the scope of permission, and grants to a public key of the second DID the defined scope of permission. The computing system then generates a signature by a private key of the first DID. The signature proves the delegation of the defined scope of permission to the public key of the second DID. A portion of data related to the delegation is then propagated onto a distributed ledger.

In some embodiments, the computing system further maps a plurality of relationships to a plurality of scope of permissions. The mapping data is recorded in a storage that is accessible by the computing system. Based on the mapping data, the computing system determines the scope of permission corresponding to the relationship between the pairwise DID owners. The mapping of the plurality of relationship to the plurality of scopes of permission is based on (1) data recorded in DID documents, (2) data propagated onto the distributed ledger, and/or (3) user input(s).

In some embodiments, the computing system receives a user input for generating, updating, or deleting a mapped pair of a particular scope of permission and a particular relationship. Based on the user input, the computing system updates the recorded mapping data in the storage. In some cases, in response to the user indication, the computing system also updates delegation(s) between pairwise DIDs that have a particular relationship that is affected by the user input.

The plurality of relationships includes, but are not limited to, (1) a child-parent relationship, in which the owner of one pairwise DID is a minor child of the owner of the other pairwise DID; (2) a spousal relationship, in which the owners of the pairwise DIDs are spouses; (3) an employee-employer relationship, in which the owner of one pairwise DID is an employee of the owner of the other pairwise DID; (4) a customer-service relationship, in which an owner of one pairwise DID is a customer of the owner of other pairwise DID; or (5) a contract relationship, in which the owners of the pairwise DIDs are parties to a mutually agreed contract.

Since certain relationships between DID owners may change under various circumstances, in some embodiments, the computing system is caused to automatically update the delegations in response to changes to the relationships. In some cases, in response to a request from the second DID owner of the second DID for access to a scope of permission, the computing system determines whether the particular relationship still exists. Alternatively, or in addition, the computing system periodically checks whether the particular relationship between pairwise DIDs still exists. In some cases, in response to a user input that changes information related to the first DID or information related to the second DID, the computing system determines whether the particular relationship still exists. In response to a determination that the particular relationship no longer exists, the computing system revokes the delegation of the corresponding scope of permission and propagating data related to the revocation of permission to the distributed ledger.

In some embodiments, the defining the scope of permission includes defining one or more restrictions, and the propagating a portion of data related to the delegation includes propagating the one or more restrictions to the distributed ledger. The one or more restrictions include, but are not limited to, (1) an expiration time of the delegation, (2) a predetermined number of times that the delegatee is allowed to access a portion of data or service, or (3) a restriction that restricts the access to a portion of data, such as (i) a read permission, (ii) a write permission, (iii) a delete permission, or (iv) a delegation permission. In some embodiments, the one or more restrictions include one or more conditions, which are required to be satisfied each time the delegatee requests for accessing to the delegated permission. The one or more conditions include, but are not limited to, (i) requiring the delegatee DID to pay a predetermined amount of cryptocurrency, (ii) requiring the delegatee DID to provide one or more verifiable claims, or (iii) requiring the delegatee DID to provide particular personal data, such as (a) an email address, (b) a phone number, (c) a location, (d) a name of the delegatee, (e) an IP address, or (f) a device identifier.

In some embodiments, in response to receiving a request from the second DID owner of the second DID for access to the scope of permission, the computing system requests the second DID (i.e., the computing system associated with the second DID, including a management module, a user agent, or an ID hub of the second DID) for proof of delegation of the scope of permission. The second DID then generates a proof code and sends the proof code to the computing system. The proof code is configured to prove that the second DID has been delegated to the requested scope of permission. The computing system then receives and validates the proof code. Based on the validation result, the computing system grants or denies the request from the second DID.

In some cases, the proof code includes the signature signed by the private key of the first DID. The validating the proof code includes decrypting the signature by a public key of the first DID, and retrieving data related to the delegation from the distributed ledger. The computing system then analyzes the decrypted signature and the data related to the delegation to determine whether the proof code is valid. In some embodiments, the validating the proof code further includes verifying the requested scope of permission is within the delegated scope of permission. When the scope of permission includes one or more conditions, the computing system also determines whether the one or more conditions are satisfied.

Accordingly, the principles described herein allow users (i.e., DID owners) to delegate scopes of permissions to each other or revote previous delegations substantially instantly. Once a scope of permission is delegated, the delegatee can also access the delegated data substantially instantly. As such, the delegations are created and enforced by computing systems of the DID owners, which is advantageous because the traditional requirement for an intermediary or centralized entity for recording or enforcing delegations is eliminated. Further, since there is no centralized entity to record all the data related to the delegation between DID owners, and each pairwise DID is only used to communicate with another DID, the privacy of the DID owners are further protected.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 6A illustrates an example data structure recording relationships of pairwise DIDs;

FIG. 6B illustrates an example data structure recording mapping data that maps multiple relationships to multiple scopes of permission;

FIG. 6C illustrates an example user interface of a management module that allows a user to manually enter or update relationships and scopes of permission corresponding to pairwise DIDs;

FIG. 7 illustrates an example delegation proof for delegating a scope of permission from Alice to Bob;

DETAILED DESCRIPTION

The embodiments described herein are related to delegating a scope of permission between pairwise decentralized identifiers (DIDs). Because the principles described herein is performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. The memory takes any form and depends on the nature and form of the computing system. A computing system is distributed over a network environment and includes multiple constituent computing systems.

Figure 1:
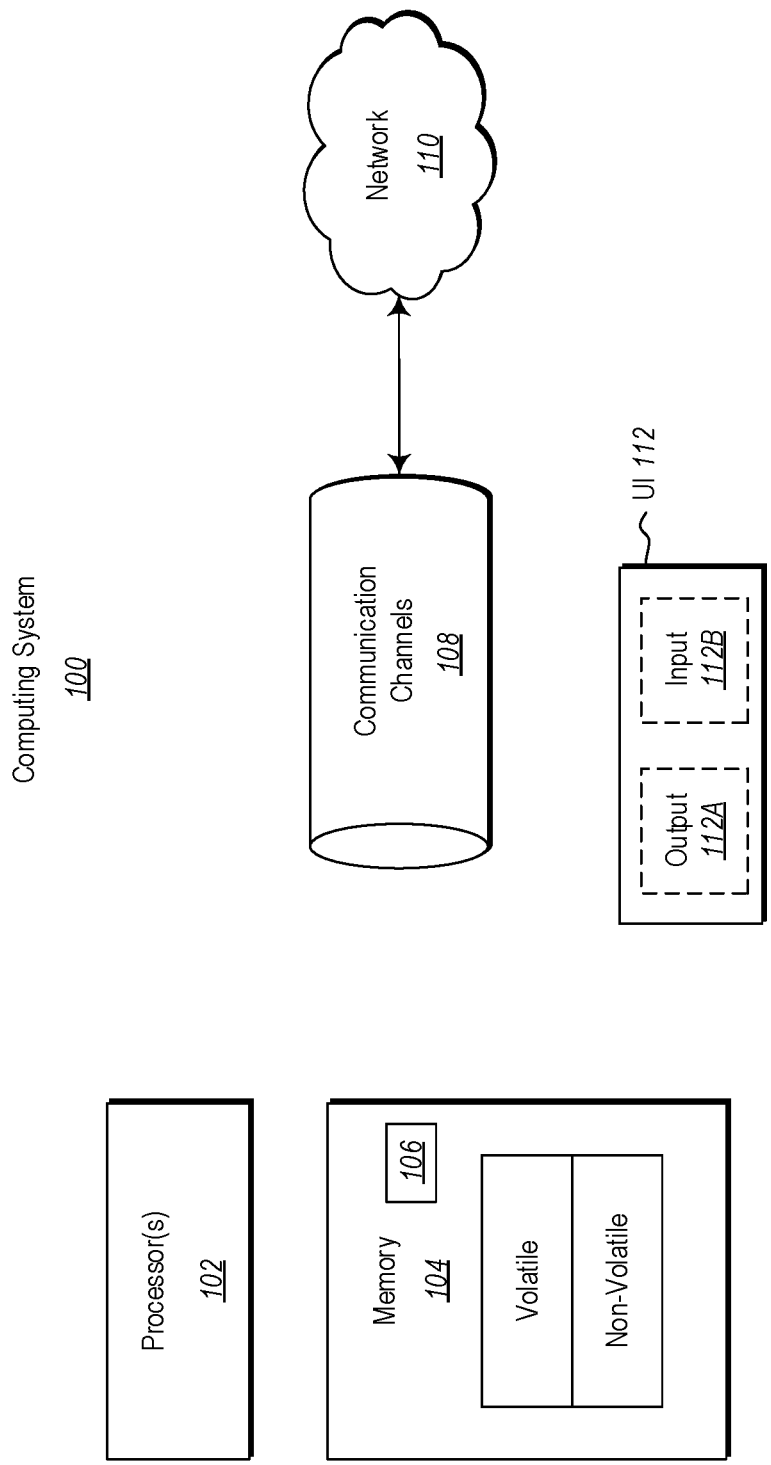
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 includes a general-purpose processor and also includes a field-programmable gate array (FPGA), an application-specific integrated circuit (ASIC), or any other specialized circuit. The memory 104 is physical system memory, which is volatile, non-volatile, or some combination of the two. The term "memory" also be used herein to refer to non-volatile mass storage such as physical storage media. If the computing system is distributed, the processing, memory and/or storage capability is distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component include software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within an FPGA or an ASIC, the computer-executable instructions are hardcoded or hard-wired logic gates. The computer-executable instructions (and the manipulated data) is stored in the memory 104 of the computing system 100. Computing system 100 also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions configure the computing system to perform a certain function or group of functions. The computer executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. In some cases, the invention also is practiced in distributed system environments where local and remote computing systems, which are linked (either by hardwired data links, wireless data links, or by a combination of hardwired and wireless data links) through a network, both perform tasks. In a distributed system environment, program modules are located in both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which corresponds to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as processor 102 and memory 104, as needed to perform their various functions.

Figure 2:
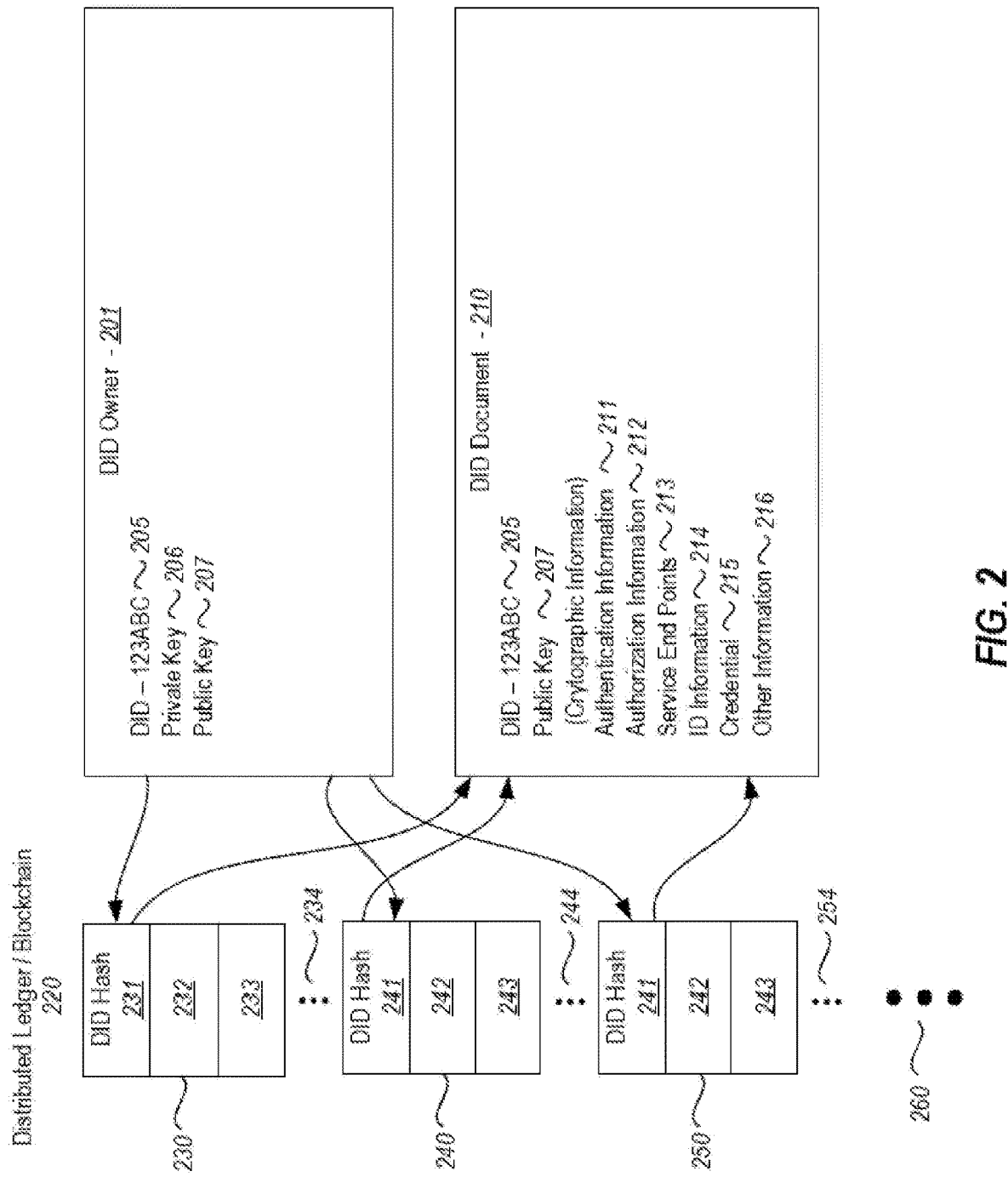
FIG. 2 illustrates an example environment for creating a decentralized identification or identifier (DID)

Some introductory discussions of a decentralized identification (DID) and the environment in which they are created and reside will not be given with respect to FIG. 2. As illustrated in FIG. 2, a DID owner 201 owns or controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 is a human being or an organization of human beings. Such organizations might include a company, department, government, agency, or any other organization or group of organizations. Each individual human being might have a DID while the organization(s) to which each belongs might likewise have a DID.

The DID owner 201 alternatively be a machine, system, or device, or a collection of machine(s), device(s) and/or system(s). In still other embodiments, the DID owner 201 is a subpart of a machine, system or device. For instance, a device could be a printed circuit board, where the subpart of that circuit board are individual components of the circuit board. In such embodiments, the machine or device has a DID and each subpart also have a DID. A DID owner might also be a software component such as the executable component 106 described above with respect to FIG. 1. An example of a complex executable component 106 might be an artificial intelligence. An artificial intelligence also owns a DID.

Thus, the DID owner 201 is any reasonable entity, human or non-human, that is capable of creating the DID 205 or at least having the DID 205 created for and associated with them. Although the DID owner 201 is shown as having a single DID 205, this need not be the case as there is any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably a globally unique identifier for identity systems anticipated to operate globally. In some embodiments, the DID 205 is a Uniform Resource Identifier (URI) (such as a Uniform Resource Locator (URL)) or other pointers that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 is any identifier that is under the control of the DID owner 201 and independent of any centralized authority.

In some embodiments, the structure of the DID 205 is as simple as a username or some other human-understandable term. However, in other embodiments, the DID 205 preferably be a random string of numbers and letters for increased security. In one embodiment, the DID 205 is a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 20. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair is generated on a device controlled by the DID owner 201. The private key 206 and public key 207 pairs should not be generated on a server controlled by any centralized authority as this causes the private key 206 and public key 207 pairs to not be fully under the control of the DID owner 201 at all times. Although FIG. 2 and this description have described a private and public key pair, it will also be noted that other types of reasonable cryptographic information and/or mechanism also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 also be used by verifying that the DID owner 201, in fact, owns or controls the DID 205.

The DID document 210 also includes authentication information 211. The authentication information 211 specify one or more mechanisms by which the DID owner 201 is able to prove that the DID owner 201 owns the DID 205. In other words, the mechanisms of authentication information 211 show proof of a binding between the DID 205 (and thus it's DID owner 201) and the DID document 210. In one embodiment, the authentication information 211 specifies that the public key 207 be used in a signature operation to prove the ownership of the DID 205. Alternatively, or in addition, the authentication information 211 specifies that the public key 207 be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third party entities the rights to modify the DID document 210 or some part of the document without giving the third party the right to prove ownership of the DID 205. For example, the authorization information 212 allows the third party to update any designated set of one or more fields in the DID document 210 using any designated update mechanism. Alternatively, the authorization information allows the third party to limit the usages of DID 205 by the DID owner 201 for a specified time period. This is useful when the DID owner 201 is a minor child and the third party is a parent or guardian of the child. The authorization information 212 allows the parent or guardian to limit the use of the DID 201 until such time as the child is no longer a minor.

The authorization information 212 also specifies one or more mechanisms that the third party will need to follow to prove they are authorized to modify the DID document 210. In some embodiments, this mechanism is similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers are used by the DID owner 201 or by third party entities to access the services that operate on behalf of the DID owner 201. Specific examples of service endpoints 213 will be explained in more detail to follow.

The ID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes. For instance, a persona is pseudo-anonymous, e.g., the DID owner 201 include a pen name in the DID document when identifying him or her as a writer posting articles on a blog; a persona is fully anonymous, e.g., the DID owner 201 only want to disclose his or her job title or other background data (e.g., a school teacher, an FBI agent, an adult older than 21 years old, etc.) but not his or her name in the DID document; and a persona is specific to who the DID owner 201 is as an individual, e.g., the DID owner 201 includes information identifying him or her as a volunteer for a particular charity organization, an employee of a particular corporation, an award winner of a particular award, etc.

The DID document 210 also includes credential information 215, which also be referred to herein as an attestation. The credential information 215 is any information that is associated with the DID owner 201's background. For instance, the credential information 215 is (but not limited to) a qualification, an achievement, a government ID, a government right such as a passport or a driver's license, a digital asset provider or bank account, a university degree or other educational history, employment status and history, or any other information about the DID owner 201's background.

The DID document 210 also includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger or blockchain 220. The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger or blockchain 220 operates according to any known standards or methods for distributed ledgers. Examples of conventional distributed ledgers that correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actually distributed ledger. Alternatively, in other embodiments the DID document 210 is stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID has 231, DID has 241, and DID has 251, which are ideally identical copies of the same DID. The DID hash 231, DID hash 241, and DID hash 251 then point to the location of the DID document 210. The distributed ledger or blockchain 220 also store numerous other representations of other DIDs as illustrated by references 232, 233, 234, 242, 243, 244, 252, 253, and 254.

In one embodiment, when the DID user 201 creates the DID 205 and the associated DID document 210, the DID has 231, DID has 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID has 241, and DID has 251 includes, in addition to the pointer to the DID document 210, a record or timestamp that specifies when the DID 205 was created. At a later date when modifications are made to the DID document 210, this also is recorded in DID has 231, DID has 241, and DID has 251. The DID has 231, DID has 241, and DID hash 251 further includes a copy of the public key 207 so that the DID 205 is cryptographically bound to the DID document 210.

Figure 3:
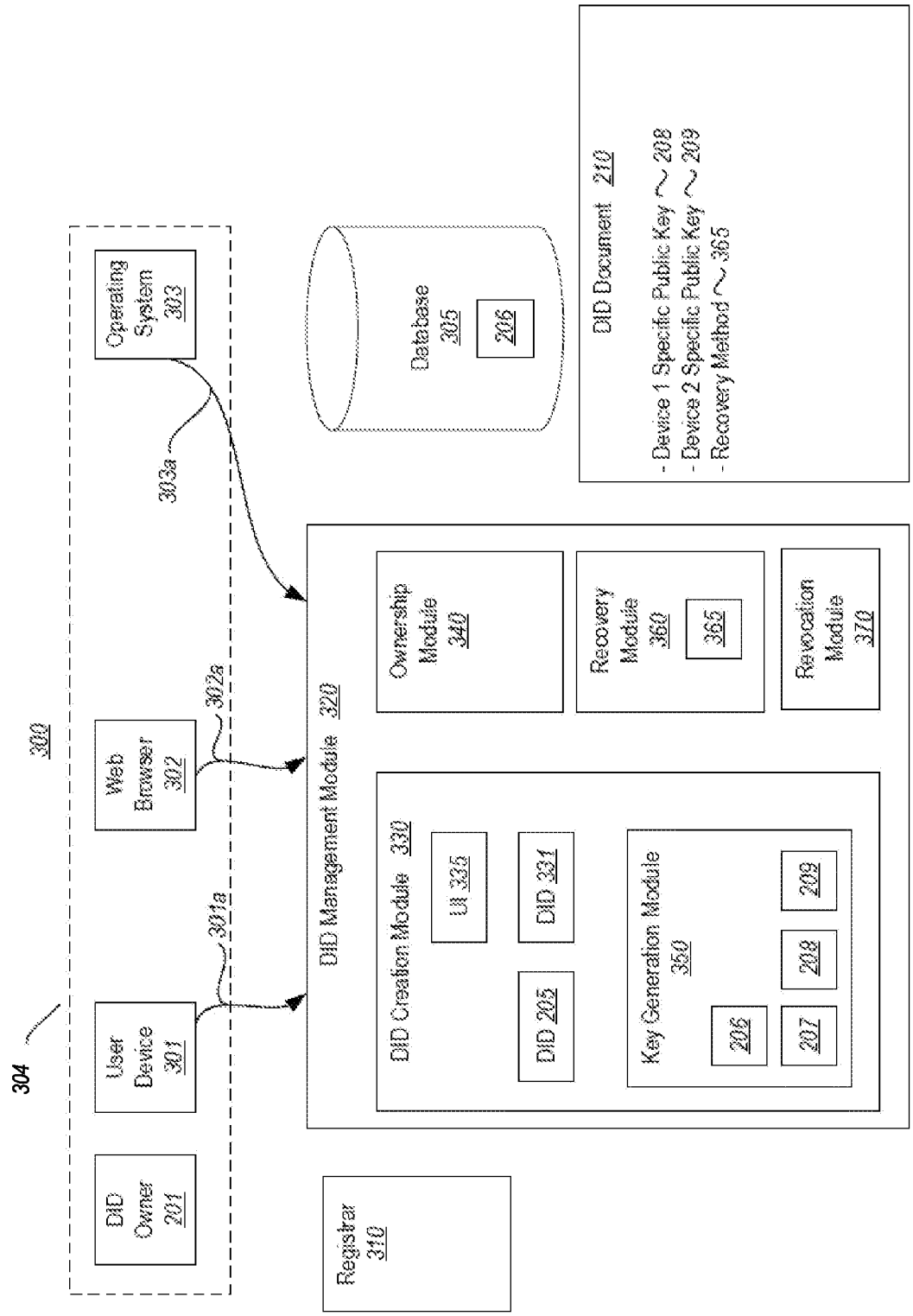
FIG. 3 illustrates an example environment for various DID management operations and services.

Having described DIDs and how they operate generally with reference to FIG. 2, specific embodiments of DIDs will now be explained. Turning to FIG. 3, an environment 300 that is used to perform various DID lifecycle management operations and services will now be explained. It will be appreciated that the environment of FIG. 3 reference elements from FIG. 2 as needed for ease of explanation.

As shown in FIG. 3, the environment 300 includes various devices and computing systems that are owned or otherwise under the control of the DID owner 21. These include a user device 301. In some cases, the user device 301 is a mobile device such as a smartphone, a computing device such as a laptop computer, or any device such as a car or an appliance that includes computing abilities. The device 301 includes a web browser 302 operating on the device and an operating system 303 operating the device. More broadly speaking, the dashed line 304 represents that all of these devices are owned or otherwise under the control of the DID owner 201.

The environment 300 also includes a DID lifecycle management module 320. Sometimes, the DID lifecycle management module 320 also be referred to as a wallet or an agent. It will be noted that in operation, the DID lifecycle management module 320 reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guide the DID owner 201 in creating the DID 205. The DID creation module 330 has one or more drivers that are configured to work with the particular distributed ledgers such as distributed ledger 220 so that the DID 205 complies with the underlying methods of that distributed ledger.

A specific embodiment will now be described. For example, UI 335 provides a prompt for the user to enter a username or some other human recognizable name. This name is used as a display name for the DID 205 that will be generated. As previously described, the DID 205 is a long string of random numbers and letters and so having a human recognizable name for a display name be advantageous. The DID creation module 330 then generates the DID 205. In the embodiments having the UI 335, the DID 205 is shown in a listing of identities and is associated with the human recognizable name.

The DID creation module also includes a key generation module 350. The key generation module generates the private key 206 and public key 207 pairs previously described. The DID creation module 330 then uses the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process uses the public key 207 in the has generation.

In some embodiments, the DID lifecycle management module 320 includes an ownership module 340. The ownership module 340 provides mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 is used by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205 and this would be reflected in an updated transaction on the distributed ledger 220 as previously described.

In some embodiments, however, it is advantageous to have a public key per device 301 owned by the DID owner 201 as this allows the DID owner 201 to sign with the specific device public key without having to access a general public key. In other words, since the DID owner 201 will use different devices at different times (for example using a mobile phone in one instance and then using a laptop computer in another instance) it is advantageous to have a key associated with each device to provide efficiencies in signing using the keys. Accordingly, in such embodiments, the key generation module generates additional public keys 208 and 209 when the additional devices execute the DID creation module 330. These additional public keys are associated with private key 206 or in some instances is paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID documents 210 include the information previously described in relation to FIG. 2 in addition to the information shown in FIG. 3. If the DID document 210 existed prior to the device-specific public keys being generated, then the DID document 210 would be updated by the creation module 330 via the registrar 310 and this would be reflected in an updated transaction on the distributed ledger 220.

In some embodiments, the DID owner 201 can keep the association of a device with a public key or even with the DID 205 a secret. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it is useful for each device or some subset of devices under the control of the DID owner 201 to each have their own DID. Thus, in some embodiments the DID creation module 330 generates an additional DID, for example, DID 331, for each device. The creation module would then generate private and public key pairs and DID documents for each of the devices and have them recorded on the distributed ledger 220 in the manner previously described. Such embodiments are advantageous for devices that change ownership as it is possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party gains control of the private key 206, especially the provider of the DID lifecycle management module 320. However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. In some embodiments, the private key 206 is stored as a QR code that scanned by the DID owner 201.

In other embodiments, the DID lifecycle management module 320 includes a recovery module 360 that is used to recover a lost private key 206. In operation, the recovery module 360 allows the DID owner 201 to select one or more recovery mechanisms 365 at the time the DID 205 is created that later be used to recover the lost private key. In those embodiments having the UI 335, the UI 335 allow the DID owner 201 to provide required information that will be needed by the one or more recovery mechanisms 365 when the recovery mechanisms are implemented. The recovery module then be run on any device associated with the DID 205.

The DID lifecycle management module 320 also includes a revocation module 370 that is used to revoke or sever a device from the DID 205. In operation, the revocation module uses the UI element 335, which allows the DID owner 201 to indicate a desire to remove a device from being associated with the DID 205. In one embodiment, the revocation module access the DID document 210 and causes that all references to the device be removed from the DID document. Alternatively, the public key for the device is removed. This change in the DID document 210 then is reflected as an updated transaction on the distributed ledger 220 as previously described.

Figure 4:
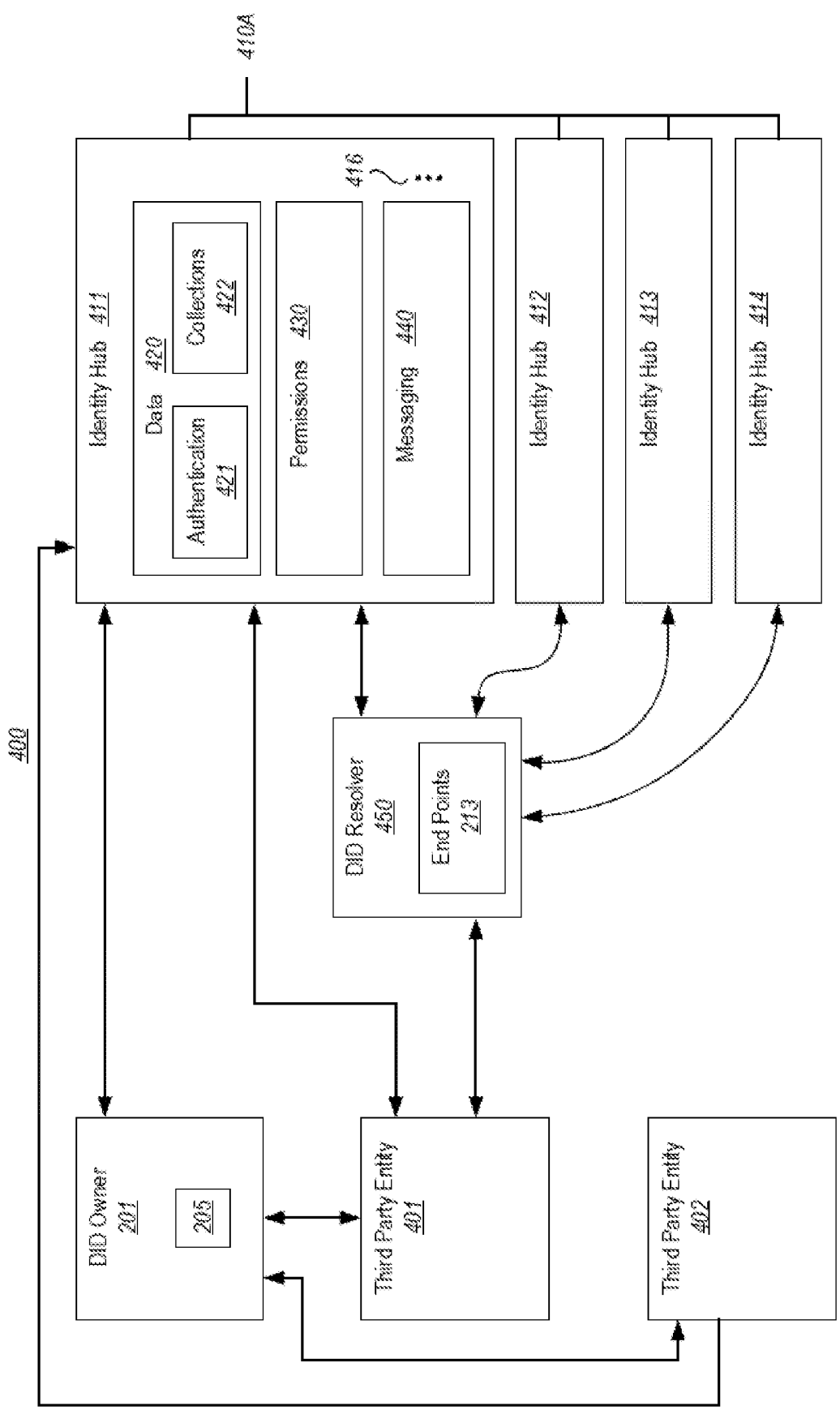
FIG. 4 illustrates an example decentralized personal storage or identity hub.

FIG. 4 illustrates an embodiment of an environment 400 in which a DID such as DID 205 is utilized. Specifically, the environment 400 will be used to describe the use of the DID 205 in relation to one or more decentralized personal storages or identity hubs. An identity hub is a storage of attributes, including keys and metadata under the control of the holder of the DID. It will be noted that FIG. 4 includes references to elements first discussed in relation to FIG. 2 or 3 and thus use the same reference numeral for ease of explanation.

In one embodiment, the identity hubs 410 are multiple instances of the same identity hub. This is represented by line 410A. Thus, the various identity hubs 410 include at least some of the same data and services. Accordingly, if any change is made to one of the identity hubs 410, the change is reflected in the remaining identity hubs. For example, the first identity hub 411 and second identity hub 412 are implemented in cloud storage and thus is able to hold a large amount of data. Accordingly, a full set of the data is stored in these identity hubs. However, the identity hubs 412 and 413 have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs are multiple instances of the same identity hub, only a full description of the first identity hub 411 will be provided as this description also applies to the identity hubs 412-415. As illustrated, identity hub 411 includes data storage 420. The data storage 420 is used to store any type of data that is associated with the DID owner 201. In one embodiment the data is a collection 422 of a specific type of data corresponding to a specific protocol. For example, in some cases, collection 422 is medical records data that corresponds to a specific protocol for medical data. In some other cases, collection 422 is any other type of data.

In one embodiment, the stored data have different authentication and privacy settings 421 associated with the stored data. For example, a first subset of the data has a setting 421 that allows the data to be publicly exposed, but that does not include any authentication to the DID owner 201. This type of data is for relatively unimportant data such as color schemes and the like. A second subset of the data has a setting 421 that allows the data to be publicly exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 or to some other associated public key in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with friends of the DID owner 201 decrypt this data.

In some embodiments, the identity hub 411 has a permissions module 430 that allows the DID owner 201 to set specific authorization or permissions for third parties such as third parties 401 and 402 to access the identity hub. For example, the DID owner 201 provides access permission to his or her spouse to all the data 420. Alternatively, the DID owner 201 allows access to his or her doctor for any medical records. It will be appreciated that the DID owner 201 permission to any number of third parties to access a subset of the data 420. This will be explained in more detail to follow.

The identity hub 411 also has a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipses 416 represent that the identity hub 411 has additional services as circumstances warrant.

In one embodiment, the DID owner 201 wish to authenticate a new device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 not initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 search the distributed ledger 220 using the DID 205, which result in the DID resolver 450 finding the DID document 210. The DID document 210 then be provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge will be structured such that only a device having access to the private key 206 will be able to successfully answer the challenge In the embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 210.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provide the DID 205 to the third party entity 401 so that the third party access data or services stored on the identity hub 411. For example, the DID owner 201 is a human who is at a scientific conference who desires to allow the third party 401, who is also a human, access to his or her research data. Accordingly, the DID owner 201 provide the DID 205 to the third party 401.

Once the third party 401 has access to the DID 205, he or she access the DID resolver 450 to access the DID document 210. As previously discussed, the DID document 210 include an endpoint 213 that is an address or pointer to the identity hub 411. The third party 401 then use the address or pointer to access the identity hub 411.

The third party 401 send a message to the messaging module 440 asking for permission to access the research data. The messaging module 440 then send a message to the DID owner 201 asking if the third party 401 should be given access to the research data. Because the DID owner desires to provide access to this data, the DID owner 201 allow permission to the third party 401 and this permission is recorded in the permissions 430.

The messaging module 440 then message the third party 401 informing the third party that he or she is able to access the research data. The identity hub 411 and the third party 401 then directly communicate so that the third party access the data. It will be noted that in many cases, it will actually be an identity hub associated with the third party 401 that communicates with the identity hub 411. However, it a device of the third party 401 that does the communication.

Advantageously, the above-described process allows the identity hub 411 and the third party 401 to communicate and to share the data without the need for the third party to access the identity hub 411 in a conventional manner. Rather, the communication is provisioned in a decentralized manner using the DID 205 and the DID document 210. This advantageously allows the DID owner to be in full control of the process.

As briefly discussed above, the identity hub 411 is hosted in a cloud service. The service provider has access to the data stored in each user's identity hub 411. Furthermore, the service provider also has access to certain activities of the DID owner. For example, the entities with whom the DID owner has shared his/her data is stored in the identity hub 411. As another example, a user has multiple DIDs and has shared data amongst the multiple DIDs, alternatively, the user has used different DID management modules to access the same data. Based on the data sharing activities, the service provider of the identity hub 411 correlate the relationships of different DIDs and find out that two DIDs is related or owned by the same owner. Thus, the user's privacy is compromised.

The principles described herein will solve these potential privacy concerns of DID owners by encrypting the personal data stored in the identity hub 411. The encryption/decryption keys are not stored or accessible by the identity hub 411, so that the DID owners not only have great control over their data from other DID owners or users, but also have their privacy protected from the service providers.

There are many different objects stored in the identity hub 411. A data object is a file, a folder, or any portion of data stored in the identity hub 411. The whole identity hub 411 is encrypted with one encryption/decryption key as one object. Alternatively, a different portion of the data stored in the identity hub 411 is encrypted with different encryption/decryption keys.

In another example embodiment, verifiable claims are issued and stored at the identity hub 411. For example, a verifiable claim that is associated with a DID owner 201 is issued by a claim issuing entity, and the issued verifiable claim is stored at the identity hub 411 that is associated with the DID owner 201. The DID owner 201 send the verifiable claim to another entity when the other entity requires to verify the credential of the DID owner. For example, the DID owner 201 is a person holding a driver's license, and the claim issuing entity is a DMV that has issued the DID owner's driver's license. The DMV issue a verifiable claim that verifies that the DID owner 201 is holding a valid driver's license. The DID owner 201 stores the verifiable claim in the identity hub 411. Another entity is a rental car company, which requires the DID owner 201 to show that he/she has a valid driver's license. The DID owner then sends the verifiable claim stored at the identity hub 411 to the rental car company.

As briefly discussed above, when a DID owner uses one DID to communicate with many different entities, the DID owner's personally identifiable information may be reconstructed based on the correlation of the communications amongst these many different entities. To further protect a DID owner's privacy, pairwise DIDs can be employed. A pair of pairwise DIDs are a pair of DIDs that are used by two DID owners only to communicate with each other. Each DID owner can generate many pairwise DIDs, each of which is only used to communicate with another entity. As such, even though the same DID owner is communicating with many different entities, each of these entities does not know the communications involving the same DID owner using other pairwise DIDs. Thus, the DID owner's privacy is further protected.

Figure 5:
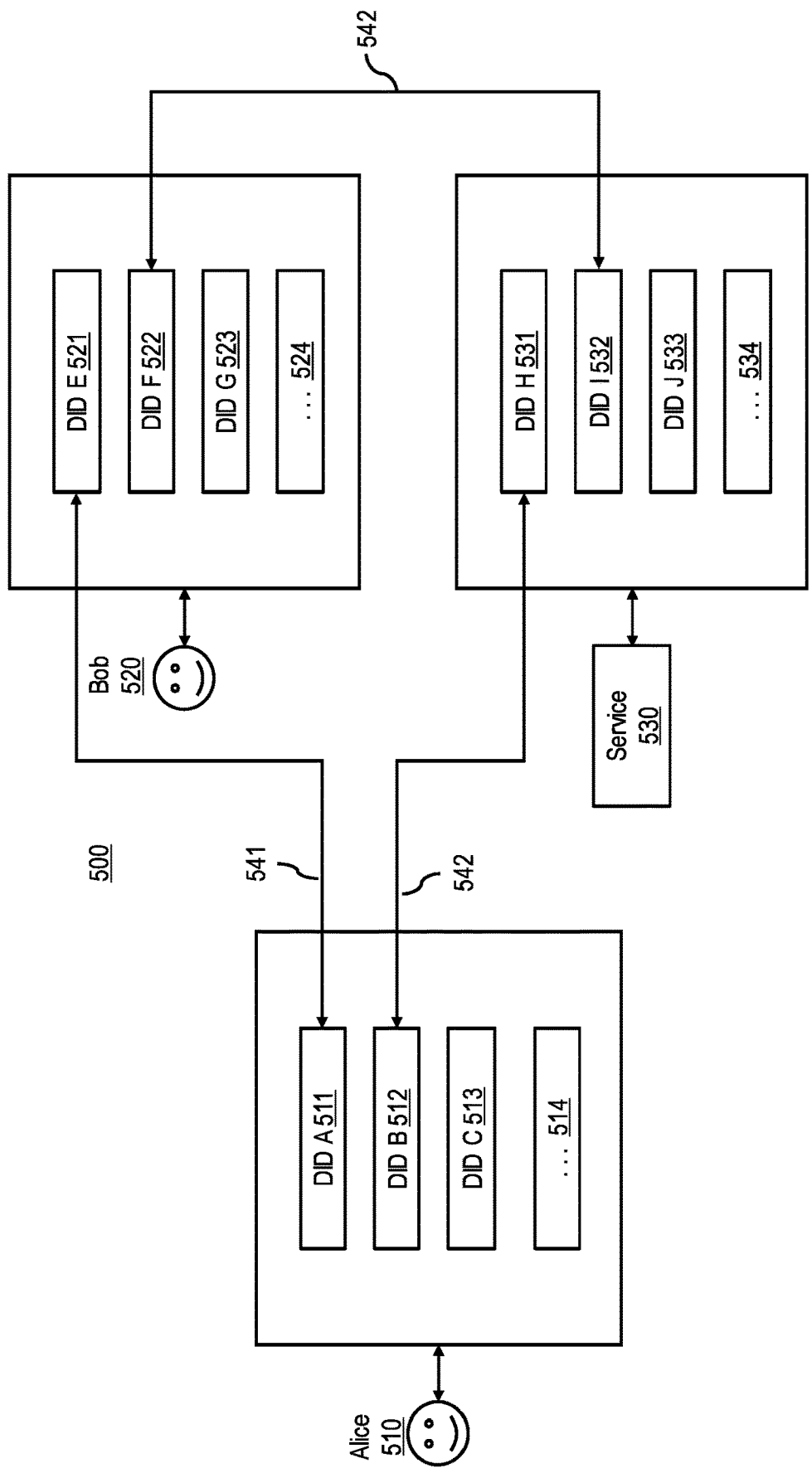
FIG. 5 illustrates an example environment, in which DID owners use pairwise DIDs to communicate with each other.

FIG. 5 illustrates an example environment 500, in which Alice 510, Bob 520, and a service provider 530 are using pairwise DIDs to communicate with each other. Each of Alice 510, Bob 520, and the service provider 530 corresponds to a DID owner 201 of FIG. 2. For example, Alice 510 owns multiple pairwise DIDs, including DID A 511, DID B 512, and DID C 513. The ellipsis 514 represents that Alice may own any number of pairwise DIDs or any number of non-pairwise DIDs. Similarly, Bob 520 also owns multiple pairwise DIDs, including DID E 521, DID F 522, and DID G 523. The ellipsis 524 represents that Bob may own any number of pairwise DIDs or any number of non-pairwise DIDs. The service provider 530 also owns multiple pairwise DIDs, including DID H 531, DID F 532, and DID J 533. The ellipsis 534 represents that the service provider 530 may own any number of pairwise DIDs or any number of non-pairwise DIDs. As illustrated in FIG. 5, DID A 511 owned by Alice 510 and DID E 521 owned by Bob 520 are a pair of pairwise DIDs. As such, Alice 510 and Bob 520 use only DID A 511 and DID E 521 to communicate with each other, which is represented by arrow 541. Similarly, DID B 512 owned by Alice 510 and DID H 531 owned by the service provider 530 are a pair of pairwise DIDs. As such, Alice 510 and service provider 530 use only DID B 512 and DID H 531 to communicate with each other, which is represented by arrow 542. Again, similarly, DID F 522 owned by Bob 520 and DID I 532 owned by service provider 530 are a pair of pairwise DIDs, which are only used for communicating between Bob 520 and service provider 530 (represented by arrow 543).

Since each pair of the pairwise DIDs is only used to communicate between two DID owners, in many cases, a relationship between the two DID owners can be clearly defined. In some embodiments, the relationship between a pair of pairwise DIDs are recorded in the management module of the DID owners. In some embodiments, such relationship data is stored with each pairwise DID (e.g., DID documents) or recorded in a distributed ledger. Alternatively, or in addition, the relationship of each pair of pairwise DIDs are recorded in one data structure (e.g., a table).

FIG. 6A illustrates an example data structure 600A that records relationships of pairwise DIDs owned by Alice 510. For example, Alice's DID A 511 is used to communicate with Bob's DID 521, and the relationship between Alice and Bob is child-parent, i.e., Alice is Bob's child. As another example, Alice's DID B 512 is used to communicate with service provider 530, and the relationship between Alice 510 and service provider 530 is the employee-employer relationship, i.e., Alice 510 is an employee of the service provider 530. The ellipsis 611A, 612A, 533A represent that there may be any number of pairs of pairwise DIDs, whose relationships are recorded in the table 600A.

In some embodiments, based on the relationships between each pair of pairwise DIDs, Alice's DID management module, user agent, and/or ID hub is configured to determine a scope of permission that is to be delegated from Alice's pairwise DID to the corresponding pairwise DID. In some embodiments, multiple relationships and multiple scopes of permission are mapped to each other. The mapping data is recorded in a storage at Alice's DID management module, user agent, and/or ID hub. FIG. 6B illustrates an example data structure storing mapping data 600B. As illustrated in FIG. 6B, the child-parent relationship 621B is mapped to delegation scope X 631B; the employee-employer relationship 622B is mapped to delegation scope Y 532B; and the customer-service relationship 623B is mapped to delegation scope Z 633B. The ellipsis 624B and 634B represent that there may be any number of mapped pairs of relationship and delegation scope.

In some cases, the computing system (e.g., Alice's management module or wallet app, user agent, or ID hub) is configured to compile the data structure 600A and/or 600B automatically based on the data recorded in DID documents or some other Alice's personal data. Alternatively, or in addition, at least a portion of the data structure 600A and/or 600B is generated based on user (e.g., Alice's) input(s). FIGS. 6A and 6B merely illustrate a simple example of how the relationship data and delegation data may be stored. Various other data structures may be implemented to achieve similar purposes. For example, in some cases, the data structures 600A and 600B may be relationally stored. Alternatively, or in addition, the data structures 600A and 600B may be stored in a same data structure.

As briefly mentioned above, in some cases, the DID owners are allowed to define the relationships between their pairwise DIDs and the scope of permission that is to be granted. FIG. 6C illustrates an example user interface 600C of a management module. The user interface 600C includes a selection list 610C that allows a user (e.g., DID owner) to select one or more particular pairs of the pairwise DIDs. The user interface 600C also includes a selection list 620C that allows the user to select one or more relationships that apply to the selected pairs of pairwise DIDs. The user interface 600C also includes a menu 630C that allows the user to select or manually define a scope of permission that is to be granted to the corresponding DID. Once the user presses the confirm button 640C, the user inputs are recorded in a data structure (e.g., the data structures 600A and/or 600B) that the computing system has access to.

Based on the data structures 600A and 600B, the computing system is configured to automatically determine a relationship between two DID owners and/or automatically delegate a scope of permission to a pairwise DID. For example, the computing system accesses the relationship data 600A to determine the relationship between a particular pairwise DID (e.g., DID A 511) and its corresponding pairwise DID (e.g., DID E 521 owned by Bob 520). Based on the determined relationship (e.g., child-parent relationship), the computing system then accesses the delegation data 600B to determine a scope of permission (e.g., scope X 631) that is to be delegated to the corresponding pairwise DID (e.g., DID E 521 owned by Bob 520). In response to a determination, the computing system delegates the scope of permission (e.g., scope X 631) to the corresponding pairwise DID (e.g., DID E 521 owned by Bob 520).

Figure 8:
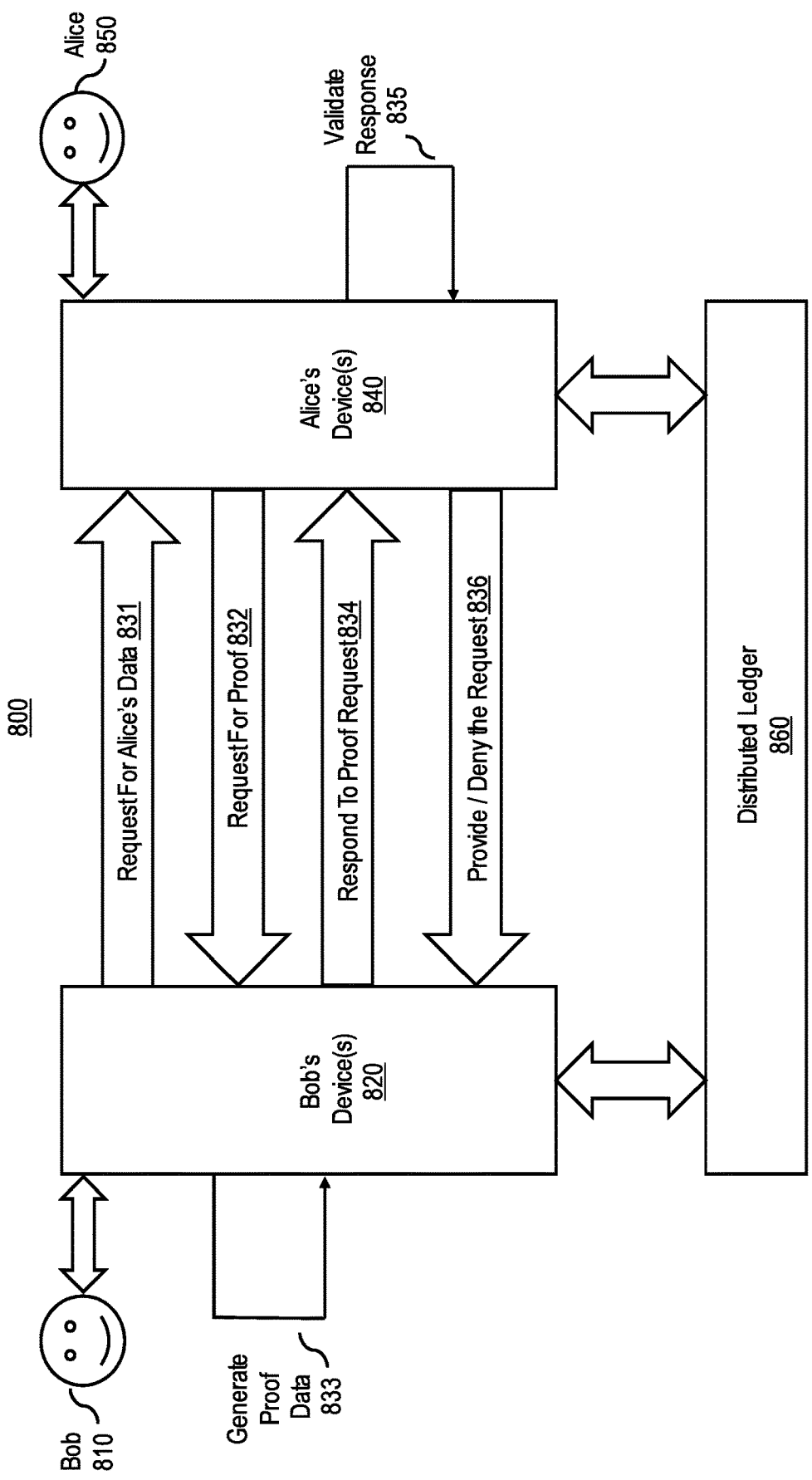
FIG. 8 illustrates an example communication pattern that occurs when a delegatee requests for access to a delegated scope of permission.

There are many various mechanisms that may be implemented to delegate a scope of permission from one DID to another DID. FIGS. 7 and 8 illustrate some embodiments that can be implemented in delegator's DID owners' management module, user agent, and/or the ID hub. In some embodiments, when Alice's DID 511 is to delegate a scope of permission to Bob's DID 521, the Alice's computing system (e.g., Alice's management module, user agent, or ID hub) updates the DID document of Alice's DID 511 or the DID document of Bob's DID 521 to record the delegation of the scope of permission. In some embodiments, a new DID is generated, and delegation of the scope of permission is recorded in the DID document of the new DID. A portion of the data related to the delegation is then propagated onto the distributed ledger.

FIG. 7 illustrates an example delegation proof 700 for delegating a scope of permission from Alice 510 to Bob 520. The delegation proof 700 includes data 710 that is related to the type of the record. Here, the type of record is "delegation" 710. The record 700 also includes data related to the delegator 720. Here, the delegator is "Alice's DID" 720. The record 700 also includes data related to "granted key". Here, the granted key is a key associated with Bob's DID.

The record 700 also needs to define the scope of permission that is granted. In some embodiments, the definition of the scope of permission includes one or more restrictions. As illustrated in FIG. 7, the record 700 includes data 740 that is related to one or more restrictions. The one or more restrictions include, but are not limited to, (1) an expiration time of the delegation, (2) a predetermined number of times that the delegatee is allowed to access a portion of data or service, or (3) a restriction that restricts the access to a portion of data, such as (i) a read permission, (ii) a write permission, (iii) a delete permission, or (iv) a delegation permission. In some embodiments, the one or more restrictions include one or more conditions, which are required to be satisfied each time the delegatee requests for accessing to the delegated permission. The one or more conditions include, but are not limited to, (i) requiring the delegatee DID to pay a predetermined amount of cryptocurrency, (ii) requiring the delegatee DID to provide one or more verifiable claims, or (iii) requiring the delegatee DID to provide particular personal data, such as (a) an email address, (b) a phone number, (c) a location, (d) a name of the delegatee, (e) an IP address, or (f) a device identifier. As illustrated in FIG. 7, the one or more restrictions 740 indicate that Bob's DID is restricted to only read a portion of Alice's personal data (i.e., Bob's DID cannot modify Alice's personal data).

Finally, the delegation data 710-740 is signed by a private key 754 associated with Alice's DID. The signature 750 includes the type of the signature 751, the time the signature is created 752, the creator 753, and the signature value 754. Here, the type of signature is Rsa Signature, the creator is Alice's DID 753, and the signature 754 is generated by a private key associated with Alice's DID 753. In some embodiments, the delegation proof is stored with the DID document of Alice DID and/or the DID document of Bob's DID. In some embodiments, a new DID is generated, and the delegation data is associated and stored with the DID document of the new DID. At least a portion of data related to the delegation proof is propagated onto the distributed ledger. In some embodiments, the complete delegation proof is propagated onto the distributed ledger. Alternatively, a transformed record (e.g., a hash, a URL, or an identifier of the delegation proof) is propagated onto the distributed ledger.

FIG. 8 further illustrates an example communication pattern 800 that occurs when a delegatee (e.g., Bob 810) requests for access to a delegated scope of permission (e.g., Alice's data). As illustrated in FIG. 8, Bob's device (e.g., Bob's management module, user agent, and/or ID hub) first requests for accessing to Alice's data, which is represented by arrow 831. The request is sent to Alice's device 840 (e.g., Alice's management module, user agent, and/or ID hub). Receiving the request, Alice's device 840 then requests Bob's device 820 for proving that Bob 810 is delegated the scope of permission for accessing the requested Alice's data, which is represented by arrow 832. Bob's device 820, in turn, generates proof data, which is represented by arrow 833. The proof data includes at least the signature signed by Alice's private key (e.g., signature 750 of FIG. 7). The proof data is then packaged in a response and sent to Alice's device 840, which is represented by arrow 834.

Receiving the proof data, Alice's device 840 then validates the response using its key and/or a portion of data related to the delegation proof propagated onto the distributed ledger 860, which is represented by arrow 835. For example, when the signature signed by Alice's private key is received, Alice's device 840 tries to decrypt the signature by a corresponding public key. The decryption result (and/or transformed decryption result) is then used to compare to the data propagated on the distributed ledger 860 to determine whether the proof data is valid. When the scope of permission includes one or more restrictions or conditions, Alice's device 840 will also verify whether the requested scope of permission falls within the one or more restrictions and/or whether the one or more conditions are satisfied. For example, if a condition requires Bob to pay a predetermined amount of cryptocurrency, the proof data is required to show a proof of payment. As another example, if a condition requires Bob to provide his email address, the proof data is required to include Bob's email address. If the proof data is valid, Alice's device 840 approves the Bob's request, otherwise, Alice's device 840 denies the Bob's request, which is represented by arrow 835.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
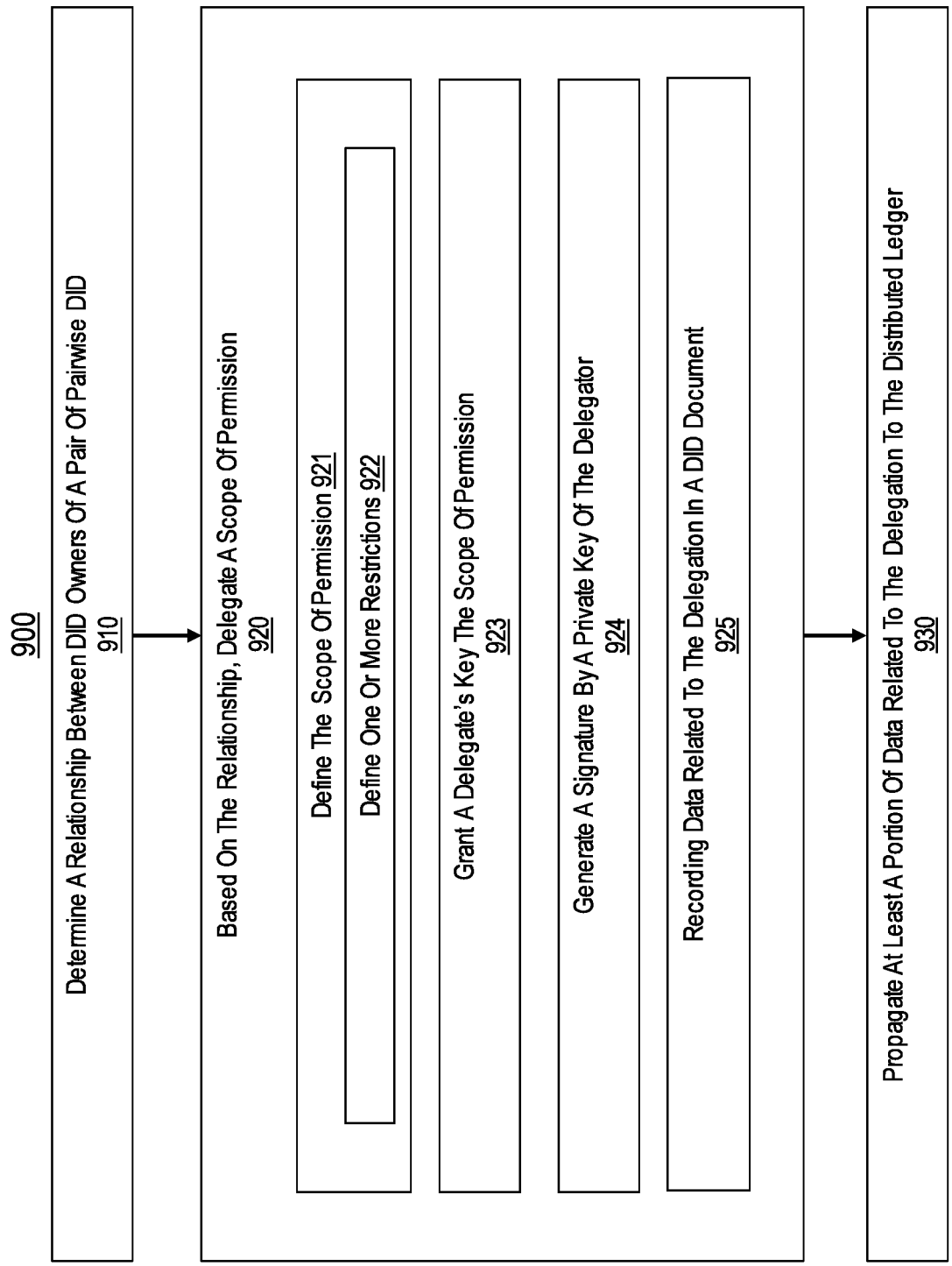
FIG. 9 illustrates a flowchart of an example method for delegating a scope of permission between two pairwise DIDs.

FIG. 9 illustrates a flowchart of an example method 900 for delegating a scope of permission between two pairwise DIDs. The DID that delegates the scope of permission is called a delegator DID or simply delegator, and the DID that receives the delegation is called a delegatee DID or simply delegatee. The method 900 is performed by a computing system associated with a delegator DID (e.g., a management module, a user agent, and/or an ID hub). The method 900 includes determining a relationship of owners of a pairwise DID (910). Based on the determined relationship, a scope of permission is delegated from the delegator to the delegatee (920).

In some embodiments, the delegation includes defining the scope of permission (921). For example, in some cases, the definition of the scope of permission includes one or more restrictions related to the scope of permission (922). The one or more restrictions include, but are not limited to, (1) an expiration time of the delegation, (2) a predetermined number of times that the delegatee is allowed to access a portion of data or service, or (3) a restriction that restricts the access to a portion of data, such as (i) a read permission, (ii) a write permission, (iii) a delete permission, or (iv) a delegation permission. In some embodiments, the one or more restrictions include one or more conditions, which are required to be satisfied each time the delegatee requests for accessing to the delegated permission. The one or more conditions include, but are not limited to, (i) requiring the delegatee DID to pay a predetermined amount of cryptocurrency, (ii) requiring the delegatee DID to provide one or more verifiable claims, or (iii) requiring the delegatee DID to provide particular personal data, such as (a) an email address, (b) a phone number (c) a location, (d) a name of the delegatee, (e) an IP address, or (f) a device identifier.

In some embodiments, the delegation includes granting a delegatee's key the scope of permission (923). The delegation also includes generating a signature by a delegator's private key (924) and recording data related to the delegation in a DID document (e.g., the delegator's DID document, the delegatee's DID document, and/or a DID document of a new DID) (925). Finally, at least a portion of data related to the delegation is propagated onto the distributed ledger (930). In some embodiments, the complete delegation proof is propagated onto the distributed ledger. In some embodiments, a transformed delegation proof, such as a hash, a URL of the DID document, or an identifier of the delegation proof, is propagated onto the distributed ledger.

Figure 10:
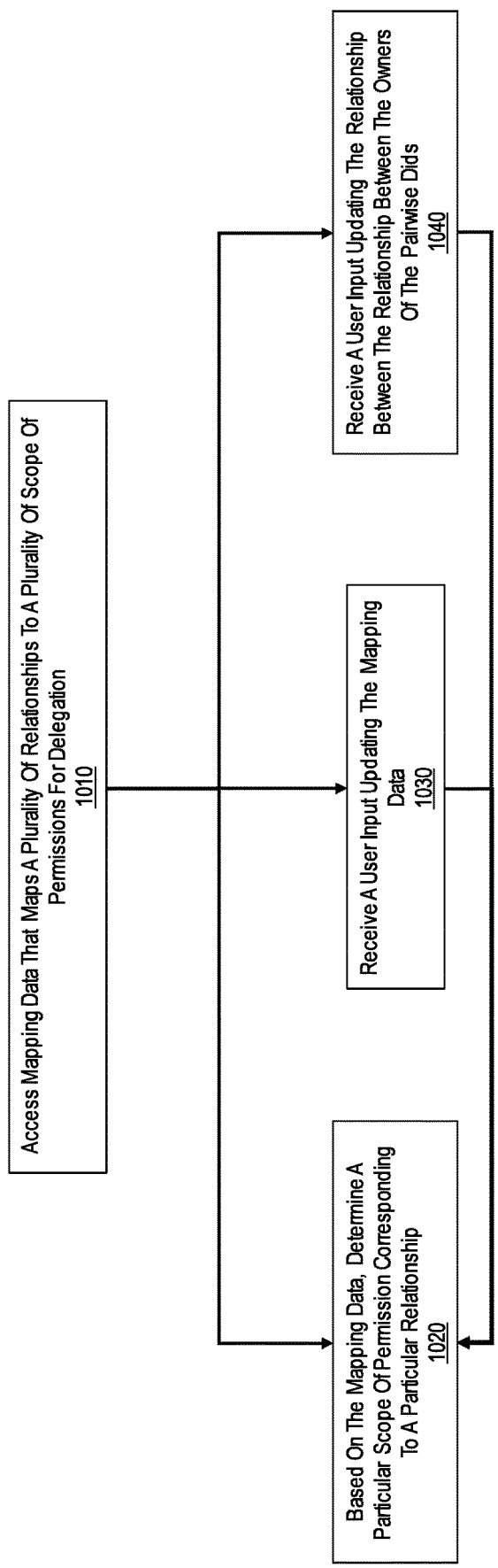
FIG. 10 illustrates a flowchart of an example method for determining a relationship between DID owners of a pairwise DIDs.

FIG. 10 further illustrates a flowchart of an example method 1000 for determining a relationship between DID owners of a pair of pairwise DIDs, which corresponds to the step 910 of FIG. 9. The method 1000 includes accessing mapping data that maps a plurality of relationships to a plurality of scope of permissions for delegation (1010). An example of mapping data is illustrated in FIGS. 6A and 6B above.

In some embodiments, the mapping data is entered by users manually (1030, 1040). In some embodiments, the mapping data is generated based on the delegator's personal data, data recorded in the DID documents and/or data propagated onto the distributed ledger. In some embodiments, the automatically generated mapping data is also allowed to be manually updated by users (e.g., DID owners). For example, in some cases, a user is not only allowed to update the mapping data (1030), the user is also allowed to update the relationship between the owners of the pairwise DIDs (1040). Based on the mapping data (1010) and/or the user's inputs (1030, 1040), the computing system then determines a particular scope of permission corresponding to a particular relationship (1020).

Figure 11:
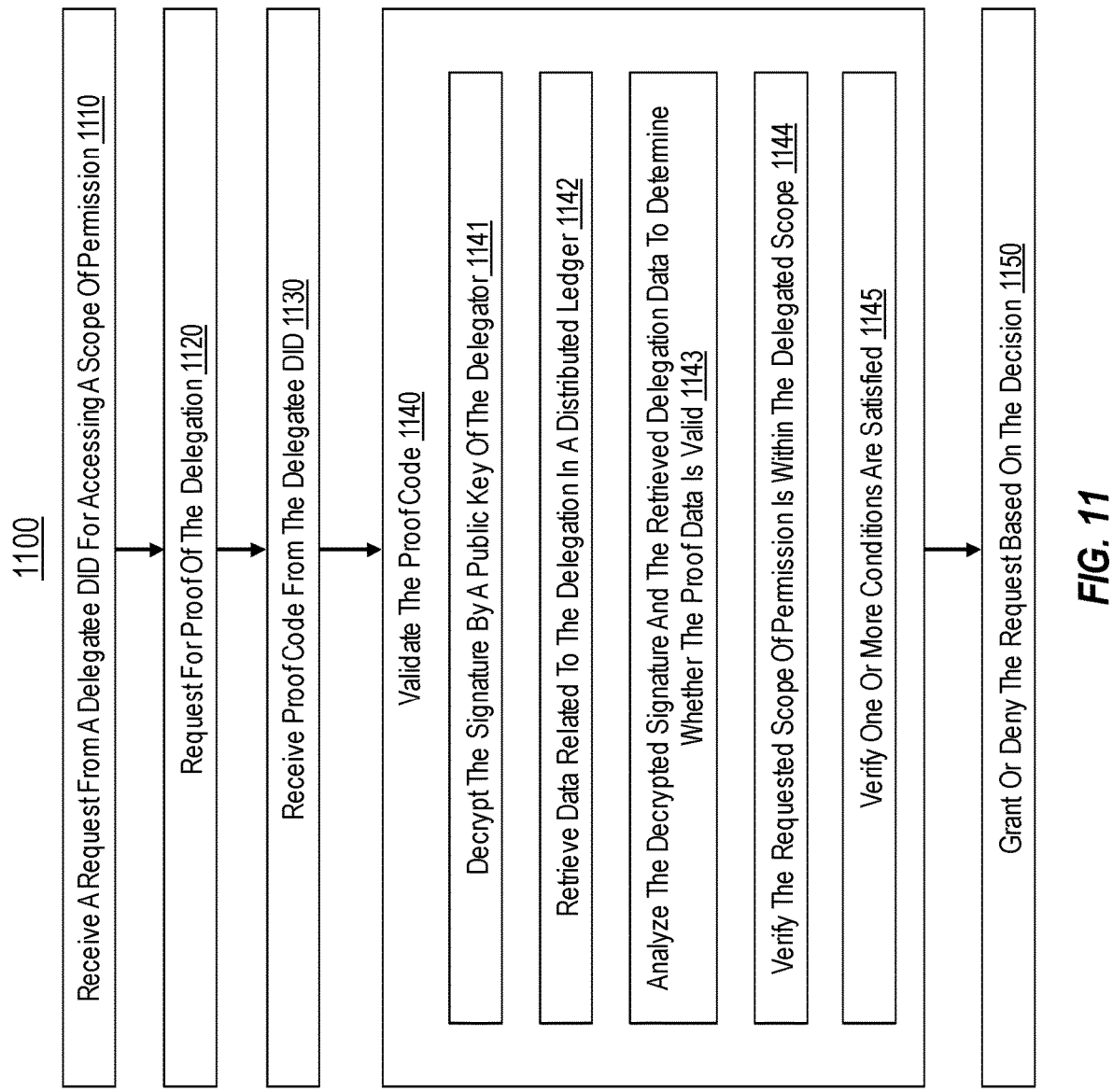
FIG. 11 illustrates a flowchart of an example method for allowing a delegatee to access a delegated scope of permission in response to the delegatee's proving that a delegation is valid.

After the delegatee receives the delegation of the scope of permission, the delegatee will be allowed to access the delegated scope of permission. FIG. 11 illustrates a flowchart of an example method 1100 for allowing a delegatee to access a delegated scope of permission in response to proving that the delegation is valid. The method 1100 is also likely implemented in a computing system that is associated with the delegator's DID. The method 1100 includes receiving a request from a delegatee DID for accessing a scope of permission (1110). In response to the request, the computing system requests the delegatee for proof of the delegation (1120). Once the proof code from the delegatee is received (1130), the computing system validates the proof code (1140).

In some embodiments, when the proof code includes a signature signed by a delegator's private key, the validation of the proof code includes decrypting the signature by a public key of delegator (1141). In some embodiments, the validation of the proof code also includes retrieving data related to the delegation in a distributed ledger (1142). The computing system then analyzes the decrypted signature and the retrieved delegation data from the distributed ledger to determine whether the proof data is valid (1143). The validation of the proof code also includes verifying the requested scope of permission is within the delegated scope (1144).

For example, when the delegated scope of permission includes one or more restrictions, the computing system verifies that the requested scope of permission does not fall within the restrictions. In some embodiments, when the restrictions include one or more conditions for accessing the scope of permission, the validation of the proof code also includes verifying that the one or more conditions are satisfied (1145). For example, when a condition requires the delegatee to pay a predetermined amount of cryptocurrency, the delegatee will need to further show a proof of the payment in the proof code. As another example, when a condition requires the delegatee to provide an email address, the proof code needs to include the email address. Finally, in response to a determination that the proof data is valid, the computing system grants the delegatee's request; otherwise, the computing system denies the delegatee's request (1150).

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
    one or more processors; and
    one or more computer-readable media having thereon computer-executable instructions that are structured such that, when executed by the one or more processors, cause the computing system to perform the following:
    determine a relationship between a first decentralized identifier (DID) owner of a first DID and a second DID owner of a second DID, the first DID and the second DID being pairwise DIDs; and
    based on the relationship, delegate a scope of permission owned by the first DID to the second DID, comprising:
        define the scope of permission;
        grant a public key of the second DID the defined scope of permission;
        generate a signature by a private key of the first DID, proving the delegation of the defined scope of permission to the public key of the second DID; and
        propagate a portion of data related to the delegation onto a distributed ledger.

2. The computing system of claim 1, the computing system further caused to:
    map a plurality of relationships to a plurality of scope of permissions;
    record the mapped data in a storage that is accessible to the computing system; and
    based on the mapped data, determine the scope of permission corresponding to the relationship between the first DID owner and the second DID owner.

3. The computing system of claim 2, wherein the mapping the plurality of relationships to the plurality of scopes of permission is based on at least one of the following: (1) data recorded in DID document(s), (2) data propagated onto the distributed ledger, or (3) user input(s).

4. The computing system of claim 2, wherein the plurality of relationships includes at least one of the following (1) a child-parent relationship, (2) a spousal relationship, (3) an employee-employer relationship, (4) customer-service relationship, or (5) a contract relationship.

5. The computing system of claim 2, the computing system further caused to:
    in response to a request from the second DID owner of the second DID for access to a scope of permission, determine whether a particular relationship still exists; and
    in response to a determination that the particular relationship no longer exists, revoke the delegation of the corresponding scope of permission and propagate a portion of data related to the revocation of permission to the distributed ledger.

6. The computing system of claim 2, the computing system further caused to:
    periodically check whether a particular relationship still exists; and
    in response to a determination that the particular relationship no longer exists, revoke the delegation of the corresponding scope of permission and propagate data related to the revocation of permission to the distributed ledger.

7. The computing system of claim 2, the computing system further caused to:
    in response to receiving a user input that changes information related to the first DID or information related to the second DID, determine whether a particular relationship still exists; and
    in response to a determination that the particular relationship no longer exists, revoke the delegation of the corresponding scope of permission and propagate data related to the revocation of permission to the distributed ledger.

8. The computing system of claim 3, the computing system further caused to:
    receive a user input for generating, updating, or deleting a mapped pair of a particular scope of permission and a particular relationship, and
    based on the user input, update the recorded mapped data in the storage.

9. The computing system of claim 8, the computing system further caused to:
    in response to the user input, update delegation(s) between pairwise DIDs that have a particular relationship that is affected by the user input.

10. The computing system of claim 1, wherein:
    the defining the scope of permission includes defining one or more restrictions; and the propagating a portion of data related to the delegation includes propagating the one or more restrictions to the distributed ledger.

11. The computing system of claim 10, wherein the one or more restrictions includes an expiration time of the delegation.

12. The computing system of claim 10, wherein the one or more restrictions includes a restriction that restricts access to a portion of data or service for a predetermined number of times.

13. The computing system of claim 10, wherein the one or more restrictions includes a restriction to access to a portion of data, the restriction includes at least one of the following: (1) a read permission, (2) a write permission, (3) a delete permission, or (4) a delegation permission.

14. The computing system of claim 10, wherein the one or more restrictions includes one or more conditions, the one or more conditions including at least one of the following: (1) requiring the second DID to pay a predetermined amount of cryptocurrency, (2) requiring the second DID to provide particular personal data, or (3) requiring the second DID to provide one or more verifiable claims,
wherein the particular personal data includes at least one of the following: (1) an email address, (2) a phone number, (3) a location, (4) a name of the second DID owner, (5) an IP address, or (6) a device identifier.

15. The computing system of claim 10, the computing system further caused to perform the following:
receive a request from a device of the second DID owner for accessing to a scope of permission;
request for proof of delegation of the requested scope of permission;
receive a proof code from the device of the second DID owner, the proof code configured to prove that the second DID has been delegated to the requested scope of permission;
validate the proof code; and
based on the validation of the proof code, grant or deny the request from the second DID.

16. The computing system of claim 15, wherein the proof code includes the signature signed by the private key of the first DID.

17. The computing system of claim 15, wherein the validating the proof code includes:
decrypting the signature by a public key of the first DID;
retrieving data related to the delegation from the distributed ledger; and
analyzing the decrypted signature and the data related to the delegation to determine whether the proof code is valid.

18. The computing system of claim 15, wherein the validating the proof code further includes:
verifying the requested scope of permission is within the delegated scope of permission; and
when the scope of permission includes one or more conditions, determining whether the one or more conditions are satisfied.

19. A method implemented at a computing system for delegating a scope of permission owned by a first decentralized identifier (DID) to a second DID, the first DID and the second DID are pairwise DIDs, comprising:
determining a relationship between the first DID and a second DID, the first DID and the second DID are pairwise DIDs; and
based on the relationship, delegating a scope of permission owned by the first DID to the second DID, comprising:
defining the scope of permission;
granting a public key of the second DID the defined scope of permission;
generating a signature by a private key of the first DID, proving the delegation of the defined scope of permission to the public key of the second DID; and
propagating a portion of data related to the delegation onto a distributed ledger.

20. A computer program product comprising one or more hardware storage devices having stored thereon computer-executable instructions that are structured such that, when executed by one or more processors of a computing system, the computer-executable instructions cause the computer system to perform at least:
determine a relationship between a first decentralized identifier (DID) and a second DID, the first DID and the second DID are pairwise DIDs; and
based on the relationship, delegate a particular scope of permission owned by the first DID to the second DID, comprising:
defining the scope of permission;
granting a public key of the second DID the defined scope of permission;
generating a signature by a private key of the first DID, proving the delegation of the defined scope of permission to the public key of the second DID; and
propagating a portion of data related to the delegation onto a distributed ledger.

* * * * *